April 20, 1948.   P. E. MERCIER   2,439,898
ENGINE COOLING SYSTEM
Filed Jan. 17, 1945   6 Sheets-Sheet 1

Fig. 1.

INVENTOR:
PIERRE E. MERCIER
BY
ATTORNEYS

April 20, 1948.   P. E. MERCIER   2,439,898
ENGINE COOLING SYSTEM
Filed Jan. 17, 1945   6 Sheets-Sheet 4

Patented Apr. 20, 1948

2,439,898

UNITED STATES PATENT OFFICE 2,439,898

ENGINE COOLING SYSTEM

Pierre Ernest Mercier, New York, N. Y., assignor to Fairchild Engine and Airplane Corporation, Farmingdale, N. Y., a corporation of Maryland Application January 17, 1945, Serial No. 573,273

12 Claims. (Cl. 123—171)

1

This invention relates to engine cooling systems, and has particular reference to a system for air cooling the cylinders of aeronautical and other engines simultaneously from opposite sides, by conducting the cooling air thereto by three separate paths, and hence the system may be considered a tri-polar cooling system.

It is common practice to cool aeronautical engines by flowing air under pressure over the cylinders from an air scoop which collects a portion of the air stream under such conditions that a substantial static pressure builds up in the scoop, with the result that there is a uniform distribution and steady flow of air under pressure from the scoop through outlets adjacent the cylinders formed by intercylinder baffles or the like. However, certain aeronautical engines, particularly high output engines, are not uniformly cooled by this system, because, although the air may be supplied uniformly over the surfaces of the cylinders, the latter are not uniformly heated so that some areas require more air than others, in order to obtain uniform cooling. This problem is particularly acute with respect to conditions at high altitudes. Often the intercylinder spaces are not large enough to permit sufficient air to reach the lee portions of the cylinders, which therefore become overheated. Furthermore, the length of the path of air flow between the fins is such that frequently it is impossible to pass the required amount of air over the cylinder in the usual manner because of the excessive pressure drop required.

In accordance with the present invention, a selective and differential air pressure cooling system, preferably adapted for aeronautical engines, is provided in which the cooling air is conducted from the air scoop or other source to opposite sides of the cylinder bank for distribution at two points at the exhaust side and one point at the intake side, the high pressure air being distributed first along the cylinder barrel, is supplemented by the air flowing through the confined intercylinder spaces, and then the augmented volume of medium pressure air is distributed at the said three points to the cylinder head, finally to flow thereover before eduction as low pressure spent cooling air. The cooling air is accordingly distributed at a substantially uniform temperature differential throughout the system, first engaging the relatively cooler barrel of the cylinder, where friction and conducted heat are to be removed, then the slightly warmed air in greater volume is supplied to the side of the combustion chamber, and finally the warmed air is used to cool the hotter head portion, meanwhile being confined to flow over those areas of the cylinder that require the most cooling, e. g., the piston thrust points on the barrel, the spark

2 plug areas, at the combustion zone, and the exhaust and upper combustion regions at the head.

In a preferred embodiment of the tri-polar cooling system of this invention, the cooling air is supplied from a divided scoop or two separate air scoops to a pair of conduits extending along both sides of the cylinder bank at the barrel portions thereof, and having three openings at each cylinder, two at the exhaust side and one at the intake side, through which the high pressure cooling air flows over the cooling fins on the barrels and between the intercylinder spaces to cool those selected areas accordingly. The high pressure air is confined to the barrel portions of the cylinders by a common wall of the conduits extending normal to the cylinder axes and thus separating the barrel portions from the remainder of the cylinders, except for openings in said wall through which the air collected from the three distributing points and the intercylinder spaces is conducted by stacks extending substantially parallel to the cylinder axes. This collected air, slightly warmed by its passage between and over the barrels and their cooling fins is then conducted by the stacks to flow between the cylinder head fins and over the cylinder heads, being divided between the two zones in accordance with the tri-polar distribution, the hot spent cooling air discharged from each zone being educted to atmosphere, having thus effectively cooled the areas to which it is conducted by the shortest paths so that uniform cooling of the entire cylinder results within the total cooling capacity of the air.

It will be seen that with the selective air pressure cooling system of this invention, large volumes of air may be distributed at substantial velocity and pressure upon and around those portions of an engine cylinder barrel and head, which require special cooling because the heat rejection is greatest at these points. In an inline engine those portions requiring special cooling are the upstream and downstream sides of the cylinders, partly due to piston thrust at those points, whereas in a radial engine, they are the lateral sides of the cylinders, i. e., the intercylinder sides, in this case also partly due to piston thrust at these points. The arrangement of this invention permits efficient cooling of both inline and radial engines with a lower air pressure drop than is required with former cooling methods.

For a more complete understanding of the invention, reference may be had to the accompanying drawings, in which.

Figure 1:
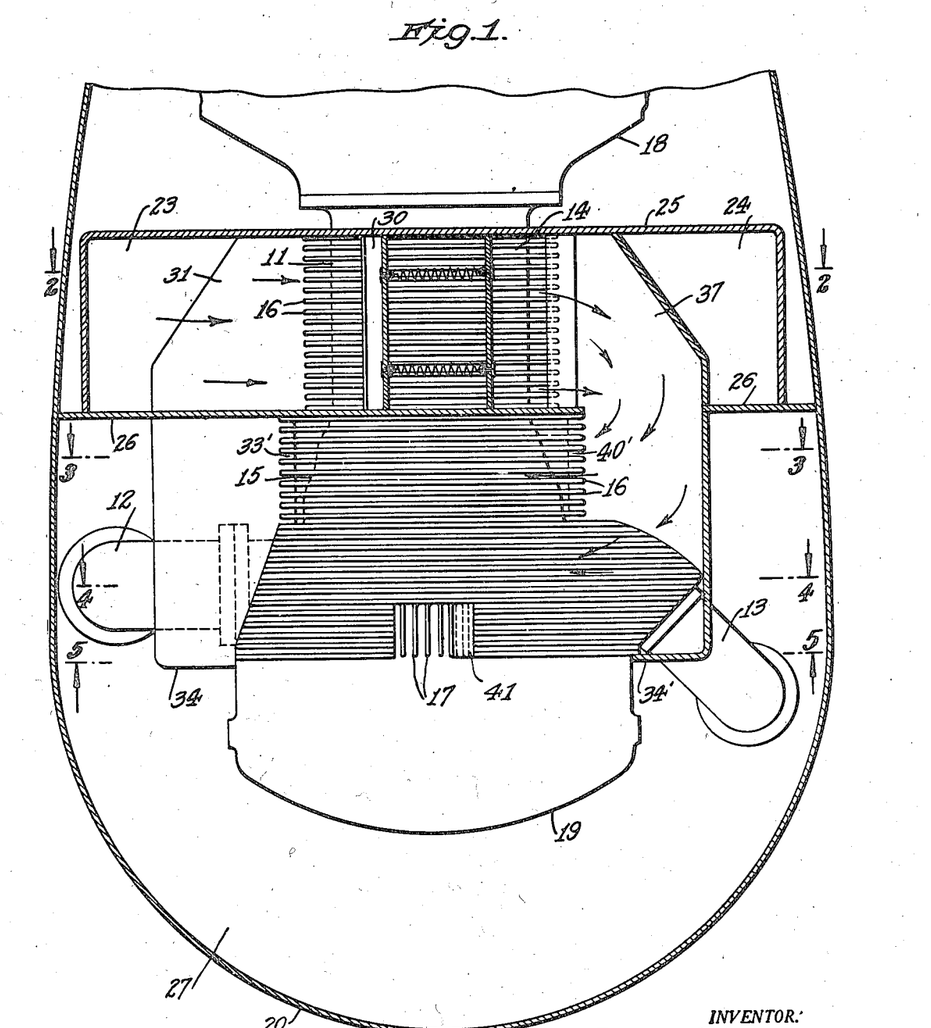
Figure 1 illustrates the tri-polar cooling system of this invention applied to an inverted inline aeronautical engine, as seen in transverse section along the line I—I of Fig. 2.
Figure 2:
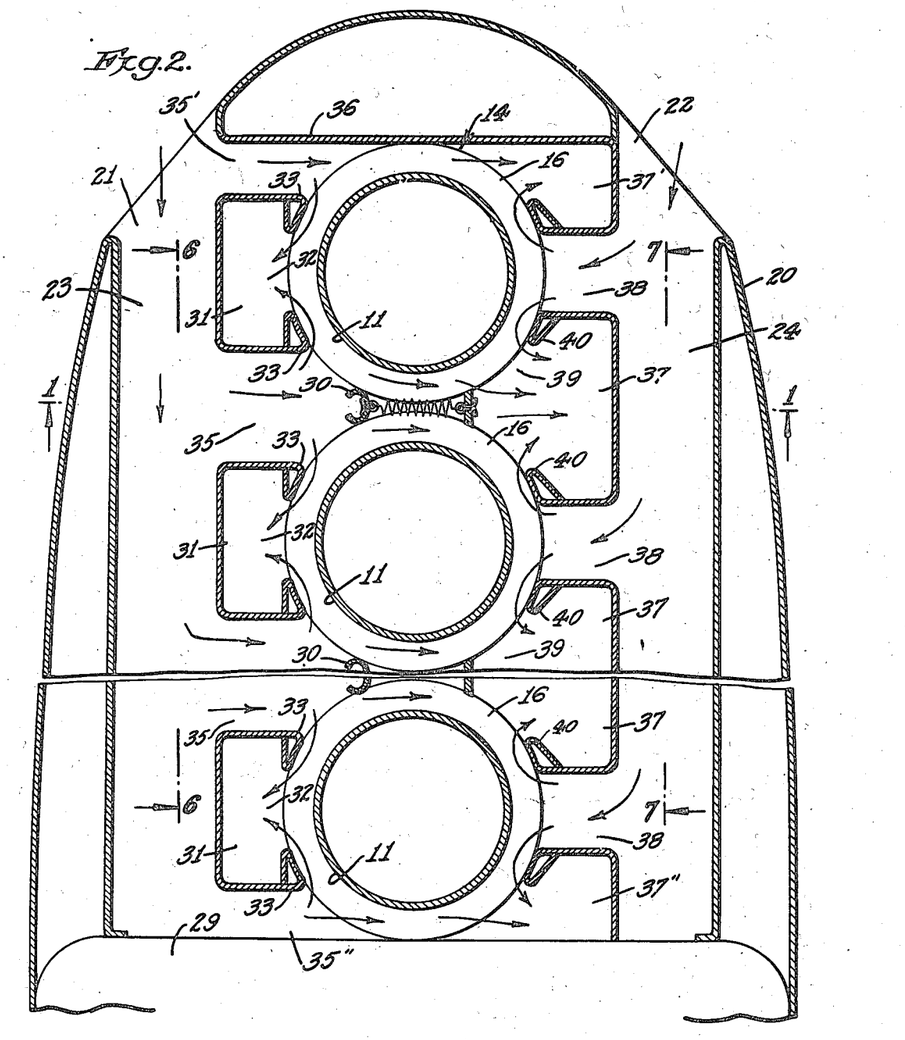
Fig. 2 is a horizontal section therethrough as seen along the line 2—2 of Fig. 1, only three cylinders being shown.

Referring to Figs. 1 and 2, numeral 11 designates the cylinders, which may be six in number, and arranged in a bank or row, as in a conventional inverted inline aeronautical engine, each cylinder 11 being provided with the usual intake and exhaust pipes 12 and 13, respectively. The cylinder barrels 14 and the heads 15 are provided with the usual horizontal cooling fins 16, the head 15 being additionally provided with cooling fins 17 extending longitudinally of the bank or row of cylinders 11 and shown in Fig. 5 as lying in the space between the intake and exhaust port housings. The crankcase 18 and the cam shaft housing 19 are positioned above and below the cylinder bank in accordance with the usual construction of inverted inline engines.

As shown particularly in Fig. 1, a cowling 20 of streamlined configuration encloses the engine and this cowling is preferably provided with two air-intake openings 21 and 22, Fig. 2, directed in the direction of travel of the engine so that the air stream flows into these openings, although a single large area intake opening will serve the same purpose. Air intake opening 21 leads to air scoop 23 positioned along the intake side of the engine, and opening 22 leads to air scoop 24 positioned along the exhaust side of the engine. The upper wall 25 of both scoops 23 and 24 extends transversely of the cylinder bank immediately above the cooling fins 16 of the barrel 14, as shown particularly in Fig. 1. The horizontal lower wall or floor 26 of both scoops 23 and 24 is located at the junction between the barrel and head portions 14 and 15, respectively, as shown particularly in Fig. 1, and preferably extends entirely across the interior of the cowling 20 so as to divide it into upper and lower compartments. The upper compartment houses the two scoops 23 and 24 and the lower compartment 27 constitutes the low pressure or eduction chamber from which spent cooling air is exhausted through gills 28, Figs. 3, 4 and 5, located adjacent the fire wall 29 and so arranged that the slipstream flowing over the cowling 20 creates a suction at the gills 28.

Figure 6:
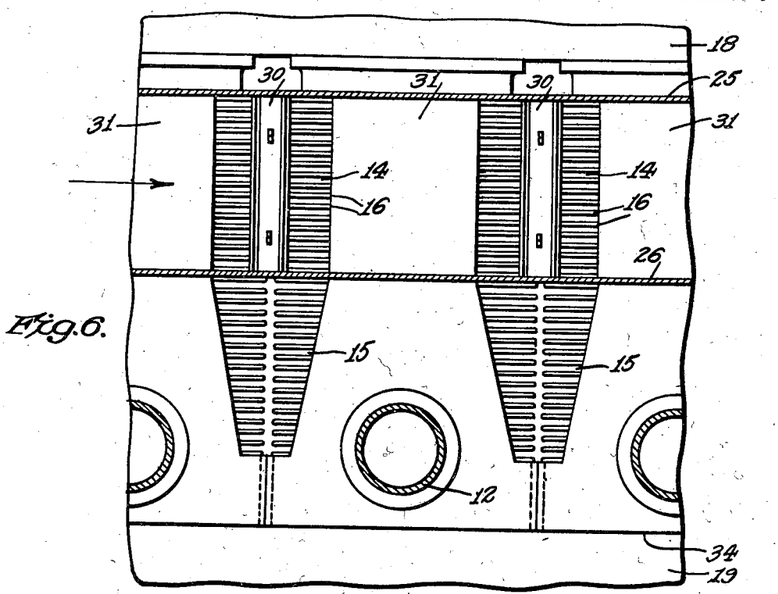
Fig. 6 is an elevation showing two adjacent cylinders and the corresponding stacks on the intake side of the cylinder, as seen along the line 6—6 of Fig. 2.

The intercylinder spaces between the barrels 14 are substantially closed by baffles 30, Figs. 2 and 6, on the intake side of the engine within the space defined by scoop 23 as shown in Fig. 1. The spaces through which the air may flow from air scoop 23 between the cylinders 11 is thus confined to the area between the fins 16. This inter-fin area for all cylinders on the intake side of the engine within scoop 23, plus the area of the other exit opening from scoop 23 aggregates less than the intake area of the scoop opening 21, so that a substantial static air pressure builds up within scoop 23 and the air flows out of the scoop 23 between the barrel fins with substantial velocity. The same effect may be obtained by otherwise restricting the air flow out of the scoop 23 as by friction or the like.

Figure 3:
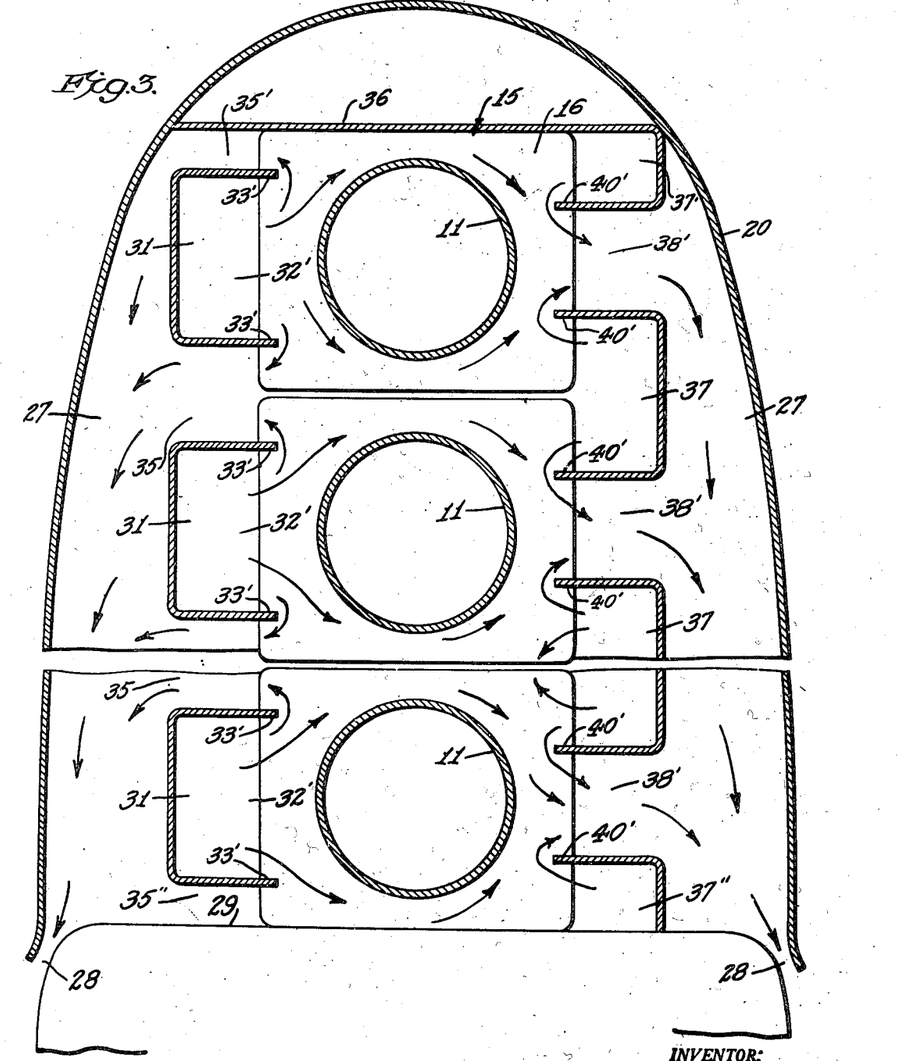
Figs. 3, 4 and 5 are similar horizontal sections as seen along the lines 3—3, 4—4, and 5—5, respectively, of Fig. 1.
Figure 4:
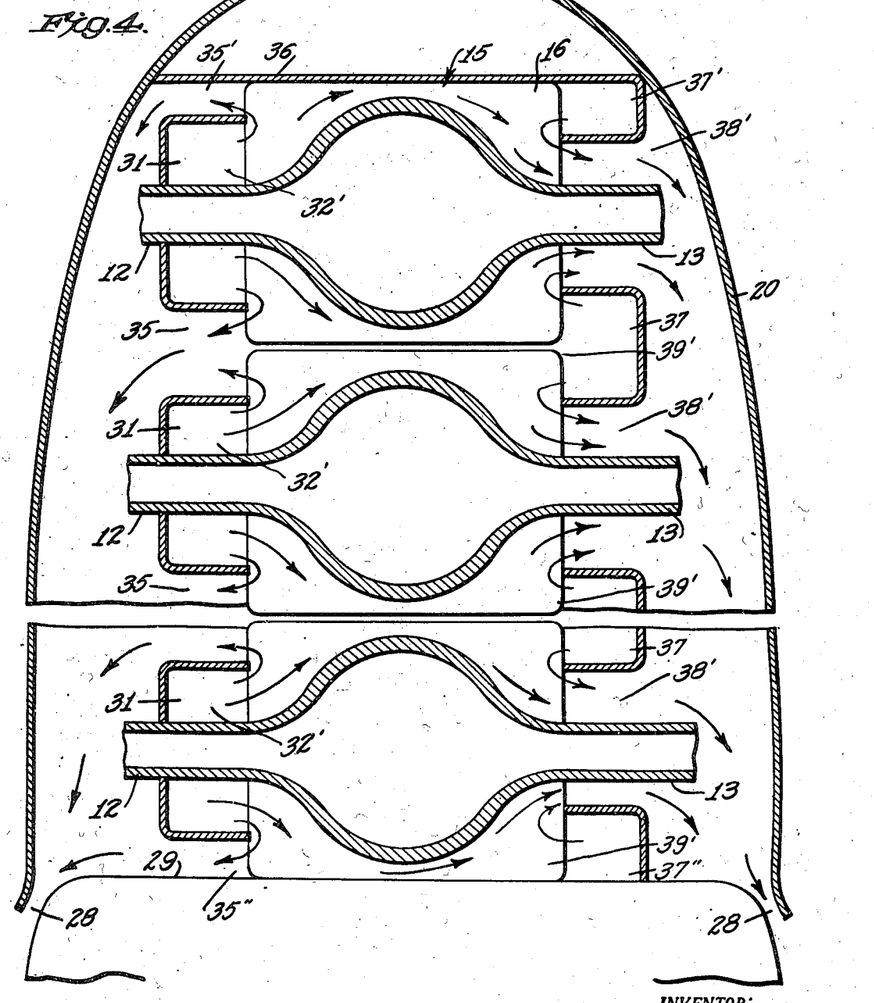

Extending upwardly and substantially into the vertical transverse plane of each cylinder axis on the intake side of the engine, is a stack 31 whose shape contour in elevation is best illustrated in Fig. 6. The stack 31 extends the full height of each corresponding cylinder, including barrel 14 and head 15 and consequently passes through the floor 26, as shown in Fig. 1. Each stack 31 is closed on all sides except that side which is directed to the corresponding cylinder, as shown in Figs. 2, 3 and 4. The exit opening 32 of each stack 31 is accordingly directed inwardly as shown so that any air flowing into stack 31 enters it through the inter-fin spaces between the cylinder barrel 14, and the free edges 33 of the side walls of the stack 31, since these free edges 33 closely engage the fins as shown in Fig. 2. As illustrated particularly in Figs. 5 and 6, the stacks 31 of adjacent cylinders are joined at their lower cylinder head ends, so that the air of adjacent stacks may mix before it continues its course over the heads of the adjacent cylinders.

It will be observed that the upper portion of each stack 31 lying in the scoop 23 receives high pressure air therefrom, and that the lower portion of each stack 31 below floor 26 lies in the low pressure chamber 27, and hence the medium pressure air in such lower portion of stack 31 flows therefrom into the low pressure area of chamber 27, as indicated by the arrows in Figs. 1 and 3, and as will be explained in greater detail. The lower end of each stack 31 is closed by the bottom plate 34, so that the only entrance and exit openings thereof face the corresponding cylinder.

As shown in Fig. 2, the adjacent stacks 31 define a passage 35 between them which leads to the corresponding intercylinder space except for the front cylinder where the forward wall of the corresponding stack 31 defines such passage 35' with a vertical partition 36 in the nose of the cowl 20. Similarly, the fire wall 29 or its equivalent forms passage 35" with the rear wall of the stack 31 of the rear cylinder. Accordingly, high pressure air from scoop 23 flows into the passages 35, 35', 35", where it divides, part past baffles 30 and part of it into corresponding stacks 31 between the fins of the corresponding adjacent cylinder barrels 14, as well as through the fins in the space between the barrel the front cylinder and partition 36 and the fins in the space between the barrel of the rear cylinder and the fire wall 29.

Figure 7:
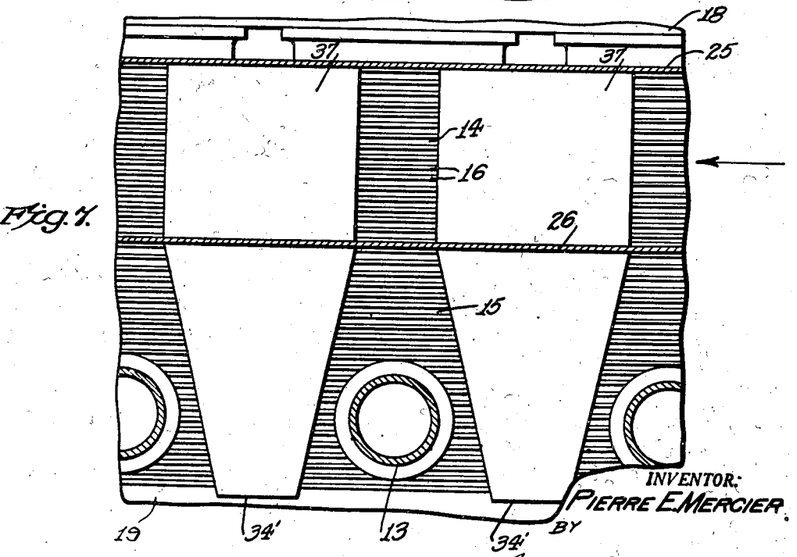
Fig. 7 is a similar view on the exhaust side of the cylinder bank, as seen along the lines 7—7 of Fig. 2.

The air scoop 24 on the exhaust side of the engine also supplies high pressure cooling air to a similar set of stacks 37, each of which spans a corresponding intercylinder space and provides with the adjacent stack 37 a high pressure cooling air passage 38 located opposite the vertical axis of the corresponding cylinder. As shown particularly in Figs. 1 and 7, each stack 37 extends through the floor 26 and is closed on all sides except that side 39 directed toward the corresponding adjacent cylinders, the free edges 40 of each side wall of stack 37 engaging the corresponding cylinder fins throughout the length of the cylinder, including barrel 14 and head 15. The lower ends of stacks 37 are closed by horizontal walls 34' and the stacks have the contour and elevation as shown in Fig. 7. The forward stack 37' and the rear stack 37" are narrower than the intermediate stacks 37, the former being defined in part by the vertical partition 36 and the latter by the fire wall 29, as shown in Fig. 2. As indicated by the arrows in Figs. 1 to 4, inclusive, the air flowing into and out of the stacks 37' and 37" is constrained to flow through the spaces between the fins of both the barrel 14 and the head 15 of each cylinder.

The free edges 40 of the stacks 37 may be provided with extensions 40' lying in vertical slots cut through the fins 16 on the corresponding cylinder head 15, as shown in Figs. 1 and 3, so that the air flowing around these extensions 40' is rendered turbulent to thereby augment the cooling of that point, as is explained in greater detail in copending application Serial No. 575,083, filed January 29, 1945, by Alfred T. Gregory. Similarly, the free edges 33 of stacks 31 may be provided with extensions 33' extending part way through the fins 16 on the corresponding cylinder heads 15 to create turbulence at that point. Such turbulence-creating blades may also be placed elsewhere as required.

Figure 5:
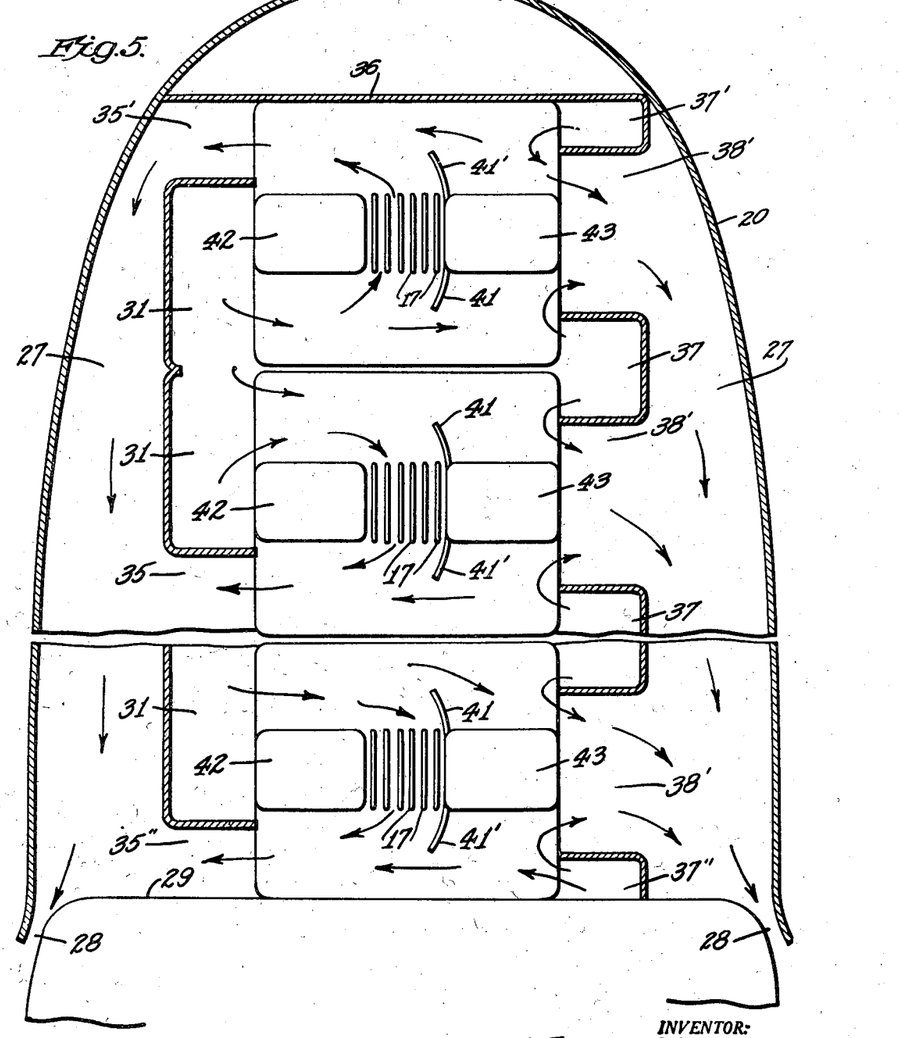

At the intake and exhaust areas of each cylinder, the intake pipes 12 extend through the corresponding stacks 31 and the exhaust pipes 13 lie in the corresponding passages 38', as shown in Figs. 4, 6 and 7. Below the intake and exhaust pipes 12 and 13, the stacks 31 of adjacent cylinders are joined, as shown in Figs. 5 and 6, and the air flows jointly therefrom between the horizontal cylinder head fins, part of it exhausting through passages 38' on the exhaust side of the engine, and part of it being diverted by wing baffles 41 to flow longitudinally of the cylinder bank 11 between the fins 17 and then to reverse its direction and flow back to the intake side of the engine to exhaust through passages 35, 35' and 35'', as shown in Figs. 1 and 5. Similar wing baffles 41' at the distance ends of fins 17 serve to guide the exit air in the reversing direction, without interference from the air traversing the head fins 17 from the exhaust side of the cylinder bank as it issues from stacks 37, 37' and 37'' at that side, also as shown in Fig. 5. Details of construction of a cylinder head of this form are shown in Patent No. 2,330,779, issued September 28, 1943, to Gregory and DePew.

In operation, the requisite condition of static pressure in the scoops 23 and 24 is obtainable whenever the outflow air from the scoops is restricted or otherwise retarded so that back pressure is created by resistance, friction, or the like, and thus causes the pressure in the scoops to build up. This condition may be obtained as described, i. e., by making the aggregate area of the outflow passages less than that of the corresponding air intake or scoop openings; or by restricting the passages 32 or 38, 31 or 37, or the passages around the baffles 30, to create sufficient friction on the air to cause the upstream pressure to build up in the scoop, even though the aggregate areas of the exits from the stacks 31 and 37 may be the same as or greater than that of the corresponding air intake openings 21 and 22; or by combinations of restricted stacks and exits therefrom; or by tortuous passages in the stacks to thereby create friction on the air instead of restricting the stacks 31 and 37 or exit passages therefrom; or by supplying the air to the scoops through a small opening at high pressure for expansion in the scoop, as when a blower is used; or by supplying the air to the scoops through a small opening at high velocity but at relatively low pressure, or the like, so long as the air pressure in the scoops is higher than at the exit thereof to secure the required pressure drop. However, the air distributing system of this invention may also be employed with smooth ducts leading directly from the source of pressure to the stacks so that the loss of energy is a minimum, as where each distributing stack is directly connected to an intake scoop.

With the aforementioned static pressure conditions provided for air scoops 23 and 24, the high pressure air from scoop 23 flows into passages 35, 35' and 35'', a part thereof flowing through the restricted intercylinder spaces past baffles 30 and through the fins 16 between the walls of adjacent cylinder barrels 14, between front barrel 14 and partition 36, and between rear barrel 14 and fire wall 29, and part flowing through the fins 16 between the walls 11 of cylinder barrels 14 and the edges 33 of the stacks 31 at the intake side of the engine. In its course the air flowing into stacks 31 selectively cools the piston thrust point of the barrel 14, which is located opposite passage 32 in the inline engine illustrated, and which requires more cooling because of the frictional heat at that point. In a radial engine, the piston thrust points are located at the intercylinder areas, in the plane of the cylinder row.

Considering first the air flowing into stacks 31 by way of passages 32, its pressure has been reduced to medium pressure by flow through the restricted passages between the barrel fins 16 and this medium pressure air flows downwardly through stacks 31, past the floor 26 and out through the passage 32' extending along the head portion 15 of the corresponding cylinder, as indicated by the arrows in Figs. 2 and 3. As this medium pressure air flows out of stacks 31 through passages 32' between fins 16 on the cylinder head 15, part of it follows the short path into passages 35, 35' and 35'', its turbulence and consequently its cooling capacity being increased by its flow over sharp-edged blades 33', inserted into the fins. After cooling the head 15, especially at points opposite the blades 40', the spent cooling air at reduced pressure, is educted to atmosphere from low pressure chamber 27 through gills 28, as indicated by the arrows in Figs. 3 and 4. The remainder of the medium pressure cooling air from stacks 31 flows through the fins 16 of the corresponding cylinder heads 15 to the exhaust side of the engine to the passages 38' for eduction through the gills 28, meanwhile cooling the intercylinder spaces.

In its course from stacks 31 connected at their lower ends as shown in Figs. 5 and 6, the medium pressure cooling air flows over the cylinder heads between the horizontal fins 17, a part thereof transversely between longitudinal fins and out through passages 35, 35' and 35'', and part across the heads to passages 38' for eduction through gills 28, meanwhile cooling the hot areas around the intake and exhaust valve ports 42 and 43, respectively, as well as the area between them at fins 17.

The high pressure cooling air from the other air scoop, 24, flows into passages 38, through the fins 16 of the cylinder barrels 14, between the walls thereof and the edges 40 of the stacks 37, to enter stacks 37, 37' and 37'', its pressure being reduced to medium pressure by reason of such restriction or throttling of its flow. In its course this air cools the other piston thrust area of the corresponding cylinder barrels 14, opposite passages 38. The medium pressure air flows down through stacks 37, 37' and 37'' and out of the passages 39', through the fins 16 of cylinder heads 15, for flow out of passages 38' and eduction through gills 28. As it flows over the sharp-edged blades 40, the air is rendered turbulent and its cooling capacity accordingly enhanced.

As the air is discharged through passage 38' at the exhaust pipes 13, it flows around the latter and aids in cooling them, as indicated in Fig. 4. Similarly, part of the air discharged from the stacks 37, 37' and 37'' flows over the cylinder heads to the intake side, as well as flowing by the short path through passages 38', as shown in Fig. 5, thereby cooling the areas around the exhaust valve ports 43 by large volumes of air flowing over short paths. However, if desired, fresh cooling air may be conducted directly to the cylinder heads, instead of from the barrels to the heads, as shown.

While several embodiments of the invention have been illustrated and described herein, it is to be understood that they are subject to variation in accordance with the particular requirements of the engine to be cooled, and may be applied with equal facility to other types of engines than those illustrated herein. For example, the invention is especially applicable to V, X, or H engines having two or more rows of cylinders extending longitudinally of the crankshaft, or radial engines having one or more rows of cylinders lying in a plane or planes normal to the crankshaft, or in line or staggered with respect to the plane of the crankshaft, and the like, all within the scope of the invention as defined by the appended claims.

I claim:

1. In an internal combustion engine having a row of cylinders, the combination of at least one air scoop enclosing a portion of the axial length of each cylinder and having an intake opening for receiving air under pressure, and a duct extending along each cylinder and having an opening adjacent said portion of each cylinder for receiving air under pressure from said scoop and a discharge opening along another portion of the axial length of each cylinder for discharging air from said duct over said other portion of each cylinder.

2. In an internal combustion engine having a row of cylinders, the combination of at least one air scoop enclosing a portion of each cylinder and having an intake opening for receiving air under pressure, and a duct extending along each cylinder at one side of said row, and having an opening adjacent said portion of each cylinder for receiving air under pressure from said scoop and a discharge opening along another portion of each cylinder for discharging air from said duct over said other portion of each cylinder, a pair of second ducts extending along each cylinder at different points of said row and each pair defining an opening adjacent said portion of each cylinder for receiving air under pressure from said scoop and an opening along another portion of each cylinder for discharging air from said other ducts over said other portions of each cylinder at that side.

3. In an internal combustion engine having a row of cylinders, the combination of at least one air scoop enclosing a portion of each cylinder and having an intake opening for receiving air under pressure, and a duct extending along the axis of each cylinder at one side of said row, and having an opening adjacent said portion of each cylinder for receiving air under pressure from said scoop and a discharge opening along another portion of each cylinder for discharging air from said duct over said other portion of each cylinder, a pair of second ducts extending along each cylinder at different points of said row and each pair defining an opening adjacent said portion of each cylinder for receiving air under pressure from said scoop and an opening along another portion of each cylinder for discharging air from said other ducts over said other portions of each cylinder at that side.

4. In an internal combustion engine having a row of cylinders and adapted to be located in an air stream, the combination of an air scoop having an opening for directing a portion of the air stream into said scoop, means cooperating with said scoop at both sides of said row of cylinders and forming with said scoop a substantially closed chamber in which the air entering said scoop builds up a substantial static pressure, said means providing passages having outlets for guiding pressure air streams over selected circumferential areas of the cylinder surfaces from both sides of said row, and means for guiding the air discharged from said outlets over other selected circumferential areas of each corresponding cylinder surface.

5. In an internal combustion engine having a row of cylinders and adapted to be located in an air stream, the combination of an air scoop for substantially enclosing a portion of the cylinders at each side of said row and having an opening for directing a portion of the air stream into said scoop, means leading from said scoop to another portion of the cylinders at each side of said row and forming with said scoop a substantially closed chamber in which the air entering said scoop builds up a substantial static pressure, said means providing passages having outlets extending longitudinally of said cylinders for guiding pressure air streams over said other portions of the cylinder surfaces at both sides of said row.

6. In an aeronautical engine having a row of cylinders and adapted to be located in the air stream, the combination of an air scoop for substantially enclosing a portion of each cylinder at opposite sides of said row of cylinders and having an opening for directing a portion of the air stream into said scoop, means cooperating with each side of said row of cylinders and forming with said scoop a substantially closed chamber in which the air entering said scoop builds up a substantial static pressure, and air conducting means leading from said chamber to another portion of each cylinder of said row, said means restricting the free outflow of air from the scoop and providing outlets for guiding pressure air streams at relatively high velocity over said first portion of each cylinder and then over said other portion of each cylinder from both sides of said row of cylinders.

7. In an aeronautical engine having a row of cylinders and adapted to be located in an air stream, the combination of an air scoop for substantially enclosing a portion of each cylinder at opposite sides of said row of cylinders and having an opening for directing a portion of the air stream into said scoop, means cooperating with said cylinders and forming with said scoop a substantially closed chamber at each side of said row, air conducting means leading from said chamber to another portion of each cylinder of said row, said means restricting the free outflow of air from said scoop to cause the air entering said scoop to build up a substantial static pressure and providing outlets for guiding pressure air streams at relatively high velocity over said first portion of each cylinder and then over said other portion of each cylinder from both sides of said row of cylinders, and means for conducting air discharged from said outlets over the head of each cylinder.

8. In an aeronautical engine having a row of cylinders and adapted to be located in an air stream, the combination of air scoops substantially enclosing opposite sides of a portion of each cylinder and having openings for directing a portion of the air stream into said scoops and forming a substantially closed chamber in which the air entering said scoop builds up a substantial static pressure, air conducting means leading from each chamber providing a restriction on the outflow of air from the corresponding scoop and having outlets at opposite sides of said row for guiding pressure air streams at relatively high velocity over said portions of each cylinder at both sides of said row of cylinders, and second air conducting means communicating with said first air conducting means and discharging air from the latter over another portion of each cylinder.

9. In an aeronautical engine having a row of cylinders each comprising barrel and head portions and adapted to be located in an air stream, the combination of at least one air scoop enclosing the barrel portions of the cylinders and having an opening for directing a portion of the air stream into said scoop, a first series of air ducts leading from a scoop and extending along and adjacent one side of said row of cylinders and each providing an elongated restricted opening adjacent the barrel and head of the corresponding cylinder, whereby the air flows into said duct opening adjacent said barrel portions from said scoop and into said duct openings over the head portions of said cylinders, a second series of air ducts leading from a scoop and extending along and adjacent different points of said row of cylinders and each providing an elongated restricted opening adjacent the barrel and head of the corresponding cylinder, whereby the air flows into said second series duct openings adjacent said barrel portions from said scoop and out said second series ducts openings over the head portions of said cylinders.

10. In an aeronautical engine having a row of cylinders, each comprising barrel and head portions and adapted to be located in an air stream, the combination of at least one air scoop enclosing the barrel portions of the cylinders and having an opening for directing a portion of the air stream into the corresponding scoop, a series of air conducting ducts leading from a scoop and extending along and adjacent one side of said row of cylinders and each providing an elongated slot adjacent the barrel and head of the corresponding cylinders, a second series of air conducting ducts leading from a scoop and extending along and adjacent different points of said row of cylinders and each providing an elongated slot adjacent the barrel and head of the corresponding cylinders, said slots restricting the flow of air into the corresponding ducts from said scoop whereby the air entering said scoop builds up a substantial pressure for causing said streams to flow over the cylinder barrels in said scoop at relatively high velocity, and means for guiding the air issuing from said duct slots over the head portions of the cylinders, whereby at least part of the air issuing from said duct outlets is conducted transversely of the row of cylinders to discharge at the same side of said row.

11. In an aeronautical engine having a row of cylinders, each comprising barrel and head portions and adapted to be located in an air stream, the combination of housing for at least part of said engine, a wall extending transversely of said row between said cylinder barrel and head portions and dividing said housing into two compartments, said barrel compartment having an opening for directing a portion of the air stream into said barrel compartment, a series of air ducts leading from said barrel compartment through said wall and extending along and adjacent one side of said row of cylinders and each providing an elongated opening opposite the barrel and head of the corresponding cylinder, a second series of air ducts leading from said barrel compartment through said wall and extending along and adjacent different points of said row of cylinders and each providing an elongated opening opposite the barrel and head of the corresponding cylinder, said ducts restricting the flow of air into said scoop for said barrel compartment, whereby the air entering said barrel compartment builds up a substantial pressure for causing said streams to flow into said duct openings over selected areas of the cylinder barrels at relatively high velocity and out of said duct openings over selected areas of the cylinder heads and into said head compartment, and means on top of the cylinder head for guiding air issuing from the corresponding duct opening longitudinally of said row before discharge on the same side of said row.

12. In an aeronautical engine having a row of cylinders, each comprising a barrel and a head portion and adapted to be located in an air stream, the combination of a housing for at least part of said engine, a wall extending transversely of said row between the cylinder barrel and head portions and dividing said housing into two compartments, said barrel compartment having an opening for directing a portion of the air stream into said barrel compartment, an air duct extending along each cylinder at one side of said row and having an elongated slot along the axis of said head and barrel portions, a second air duct extending along the intercylinder space between each pair of adjacent cylinders at the other side of said row and having an elongated slot along the barrel and head portions of said adjacent cylinders, whereby the air flows from said barrel compartment into said first duct and through the intercylinder space into said second duct and flows out of the said slots of said first and second ducts over the adjacent cylinder head surfaces into said head compartment.

PIERRE ERNEST MERCIER.

REFERENCES CITED

The following references are of record in the file of this patent:

UNITED STATES PATENTS

| Number | Name | Date |
| --- | --- | --- |
| 1,560,121 | Trewhella | Nov. 3, 1925 |
| 2,052,017 | Doman | Aug. 25, 1936 |
| 2,206,418 | Mercier | July 2, 1940 |
| 2,270,912 | Theodorsen | Jan. 27, 1942 |
| 2,289,959 | Gregory | July 14, 1942 |
| 2,302,298 | Cox | Nov. 17, 1942 |
| 2,330,779 | Gregory et al. | Sept. 28, 1943 |
| 2,336,601 | Fedden et al. | Dec. 14, 1943 |

FOREIGN PATENTS

| Number | Country | Date |
| --- | --- | --- |
| 370,183 | Germany | Feb. 27, 1923 |
| 502,731 | England | Mar. 20, 1939 |
| 502,864 | England | Mar. 23, 1939 |